May 2, 1944.     F. C. BURRELL     2,347,767
TIRE AND WHEEL LOCK
Filed Jan. 28, 1942
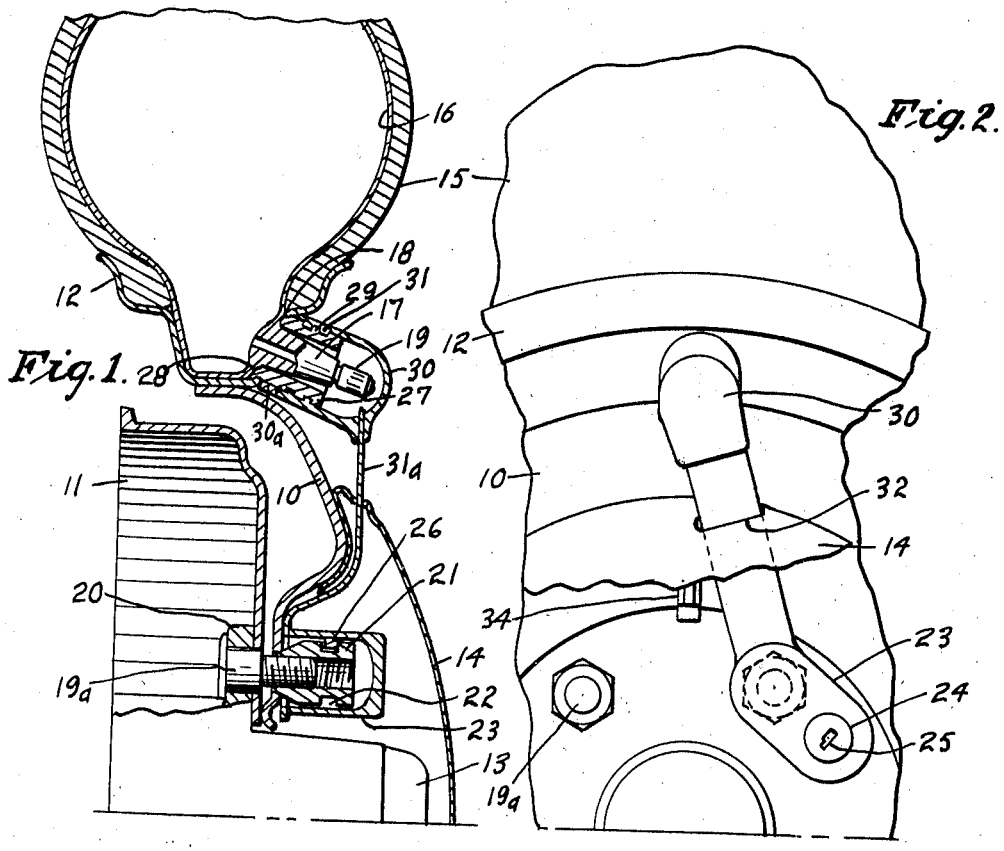
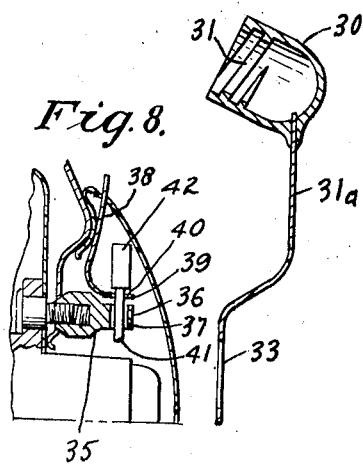
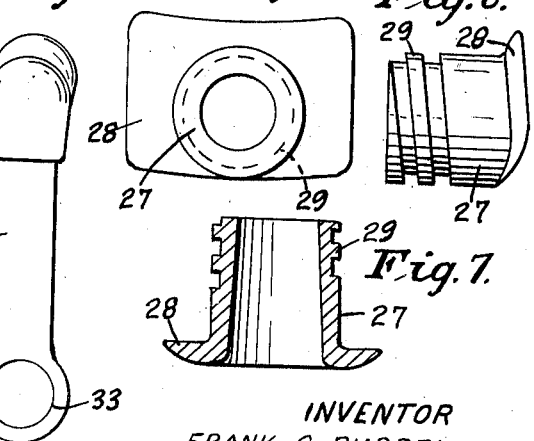
INVENTOR
FRANK C. BURRELL
by L A Paley Atty.

Patented May 2, 1944

2,347,767

UNITED STATES PATENT OFFICE 2,347,767

TIRE AND WHEEL LOCK

Frank C. Burrell, Lyons, Ill.

Application January 28, 1942, Serial No. 428,496

1 Claim. (Cl. 70—259)

This invention relates to anti-theft devices and has reference more particularly to automobile tire and wheel locks.

An object of the invention is to produce a tire and wheel lock adapted to use with disc wheels having drop center rims and inner tubes with rubber valve stems; also to improve auto-theft devices in other respects hereinafter specified and claimed.

Reference is to be had to the accompanying drawing forming a part of this specification, in which Fig. 1 is a central sectional view through an automobile wheel with my improved tire and wheel lock in position, Fig. 2 is a fragmentary elevation showing the wheel and tire lock with parts broken away to disclose the construction.

Fig. 3 is a section-elevation through a locking element.

Fig. 4 is an elevation of the locking element.

Figs. 5, 6 and 7 are a plan view, side elevation and central sectional elevation respectively of the rubber valve locking collar, and Fig. 8 is a modified form of locking device.

Referring to the drawing by numerals, an automobile wheel consists of a disc 10, a brake drum 11, a drop center rim 12, a hub 13 and a dust cover 14 as commonly used in a majority of makes of automobiles. A tire casing 15 and an inner tube 16 are mounted on the rim 12. A rubber valve stem 17 extends outwardly at an angle from the inner tube 16 through an opening 18 in the side of the rim 12. The usual valve cap 19 is screwed onto the outer metal end of stem 17. Bolts 19a attach the wheel 10 to an annular flange 20 on the hub 13.

In order to prevent the theft of a wheel, a special nut 21 is screwed onto one of the bolts 19a, said nut 21 having an annular groove 22. A lock housing 23 extends over the nut 21 and is provided at one end with a tumbler cylinder 24 having a key opening 25. A locking bolt 26 extends from the cylinder 24 into the groove 22. A locking collar 27 extends loosely around the valve stem 17 and an outstanding flange 28 on one end of collar 27 extends between the inner tube 16 and the rim 12. Multiple threads 29 are formed around the outside of the end of collar 27. A cylindrical locking cap 30 has internal threads 31 which screw onto the threads 29 so that cap 30 may be easily screwed in place over the valve cap 19 to prevent deflation and theft of the tire. A dust washer 30a is interposed between cap 30 and flange 28. A flexible steel spring 31a curves downwardly from cap 30 through a slot 32 in the dust cover 14. The lower end of spring 31a is provided with a bolt hole 33 to receive the bolt 19a between the locking housing 23 and the wheel disc 10. The spring arm 31a thus prevents the unscrewing of the locking cap 30 until locking housing 23 is first removed. As the lock housing 23 is positioned within the dust cover 14, no dust will get in the key slot 25 to interfere with the operation of the lock. Clips 34 on disc 10 removably secure the cover 14 in place. Suitable counter-balancing means (not shown) will of course be provided on the wheel 10 opposite the device hereinabove described so that the wheel will run in balance. In unlocking the device, the side of the dust cover 14 opposite the slot 32 is swung out of the way to permit the insertion of a key in key opening 25. The arm 31a however prevents the theft of the cover 14 until the locking housing 23 is removed.

In the modified form of the invention shown in Fig. 8, a locking nut 35 is provided with an outstanding flange 36 and an opening 37 is provided in the flange 36. A spring arm 38 is formed with an outstanding flange 39 and an opening 40 in the flange 39 registers with the opening 37. A locking bar 41 on a padlock 42 passes through the openings 37 and 40 to prevent the removal of nut 35 until the padlock is unlocked.

I would state in conclusion that while the example illustrated constitutes a practical embodiment of my invention, I do not wish to limit myself precisely to these details, since manifestly the same may be considerably varied without departing from the spirit of the invention as defined in the appended claim.

Having thus described my invention, I claim as new and desire to secure by Letters Patent:

In a tire and wheel lock, a removable dust cover arranged to fit over the hollow hub of a wheel, said wheel having a tire, rim and outstanding valve stem extending from said tire through said rim, said dust cover being arranged to conceal nuts for securing said wheel to a support member, one of said nuts being provided with a key operated lock, a collar having external multiple threads, a valve locking cap removably engaging the multiple threads on said collar, said collar surrounding said valve stem and having an outstanding flange extending between said tire and said rim, said dust cover having an opening, a flexible locking arm extending through the opening in said dust cover, said arm being rigidly secured to said locking nut and said locking cap so as to prevent the deflation of said tire and the removal of said dust cover and locking nut until said key lock is operated.

FRANK C. BURRELL.